(12) United States Patent
Katayama

(10) Patent No.: US 9,285,006 B2
(45) Date of Patent: Mar. 15, 2016

(54) SHOCK ABSORBER

(75) Inventor: Shigeo Katayama, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 10 days.

(21) Appl. No.: 14/345,528

(22) PCT Filed: Sep. 10, 2012

(86) PCT No.: PCT/JP2012/073057
§ 371 (c)(1),
(2), (4) Date: Apr. 14, 2014

(87) PCT Pub. No.: WO2013/042569
PCT Pub. Date: Mar. 28, 2013

(65) Prior Publication Data
US 2014/0231200 A1    Aug. 21, 2014

(30) Foreign Application Priority Data

Sep. 21, 2011    (JP) .................. 2011-206237

(51) Int. Cl.
*F16F 9/32* (2006.01)
*F16F 9/34* (2006.01)
*F16F 9/18* (2006.01)

(52) U.S. Cl.
CPC .............. *F16F 9/325* (2013.01); *F16F 9/3257* (2013.01); *F16F 9/185* (2013.01); *F16F 9/34* (2013.01)

(58) Field of Classification Search
CPC ......... F16D 9/062; F16D 9/185; F16D 9/187; F16D 9/325; F16D 9/3257; F16D 9/22; F16D 9/34; F16D 9/16
See application file for complete search history.

(56) References Cited

U.S. PATENT DOCUMENTS

| 5,398,789 | A | * | 3/1995 | Handke ................. 188/322.19 |
| 6,332,622 | B1 | | 12/2001 | Nakamura et al. |
| 2009/0200503 | A1 | * | 8/2009 | Park ......................... 251/129.15 |
| 2011/0147147 | A1 | | 6/2011 | Murakami |

FOREIGN PATENT DOCUMENTS

| JP | 2000-309215 | 11/2000 |
| JP | 2007-24195 | 2/2007 |
| JP | 2009-243636 | 10/2009 |
| JP | 2011-132995 | 7/2011 |

OTHER PUBLICATIONS

Office Action issued Nov. 26, 2014 in corresponding Japanese patent application No. 2013-534667.
Office Action issued Nov. 20, 2014 in corresponding Japanese patent application No. 2013-534667.
International Search Report issued Oct. 9, 2012 in International Application No. PCT/JP2012/073057.

* cited by examiner

*Primary Examiner* — Anna Momper
(74) *Attorney, Agent, or Firm* — Wenderoth, Lind & Ponack, L.L.P.

(57) ABSTRACT

A shock absorber including a piston inserted into a cylinder (2) having a hydraulic oil sealed therein. An outer tube (3) is provided around the outer periphery of the cylinder to form a reservoir (4) therebetween. A bottomed circular cylindrical casing (25) is joined to a side surface portion of the outer tube, and a damping force control valve (27) is housed in the casing. The bottomed circular cylindrical casing has a bottom (25A) formed with a joint surface (25B) curved along the outer peripheral surface of the outer tube and a flat inner surface (25C). The casing is integrally formed by forging.

4 Claims, 4 Drawing Sheets

SHOCK ABSORBER

TECHNICAL FIELD

The present invention relates to a shock absorber generating a damping force by controlling the flow of working fluid in a cylinder against the stroke of a piston rod.

BACKGROUND ART

Among tube type shock absorbers attached to suspension systems of automobiles or other vehicles, there is a shock absorber having a structure in which a valve mechanism serving as a damping force generating device is housed in a circular cylindrical casing joined perpendicularly to a side surface portion of a cylinder part by welding or the like, as disclosed, for example, in Patent Document 1. In such a shock absorber, conventionally, the circular cylindrical casing is produced from a pipe material, and a joint surface of the casing that is joined to the cylinder part is machined into a curved surface curved along the outer peripheral surface of the cylinder part.

CITATION LIST

Patent Document

Patent Document 1: Japanese Patent Laid-Open Publication No. 2009-243636

SUMMARY OF INVENTION

Technical Problem

The shock absorber of the type described above has the following problem.

The joint between the cylinder part and the circular cylindrical casing is demanded to exhibit high dimensional accuracy and high strength in order to seal hydraulic oil and gas as working fluids and to surely retain the valve mechanism housed in the casing.

An object of the present invention is to provide a tube-type shock absorber in which a circular cylindrical casing housing a damping force generating device is joined to a side surface portion of a cylinder part, the shock absorber being configured to allow the casing to be produced easily.

Solution to Problem

To solve the above-described problem, the present invention provides a tube-type shock absorber having a circular cylindrical casing joined to a side surface portion of a cylinder part and further having a damping force generating device housed in the casing to generate a damping force by controlling the flow of working fluid induced by sliding movement of a piston, in which the casing is in the shape of a bottomed circular cylinder having a bottom formed with a joint surface curved along the outer peripheral surface of the cylinder part and joined to the cylinder part, the bottom being further formed with an inner surface including a planar portion.

Advantages of Invention

According to the shock absorber of the present invention, it is possible to readily produce the casing for housing the damping force generating device.

LIST OF REFERENCE SIGNS

1 . . . shock absorber, 3 . . . outer tube (cylinder part), 5 . . . piston, 6 . . . piston rod, 25 . . . casing, 25A . . . bottom, 25B . . . joint surface, 25C . . . inner surface, 27 . . . damping force control valve (damping force generating device).

DESCRIPTION OF EMBODIMENTS

An embodiment of the present invention will be explained below in detail on the basis of the drawings.

Figure 1:
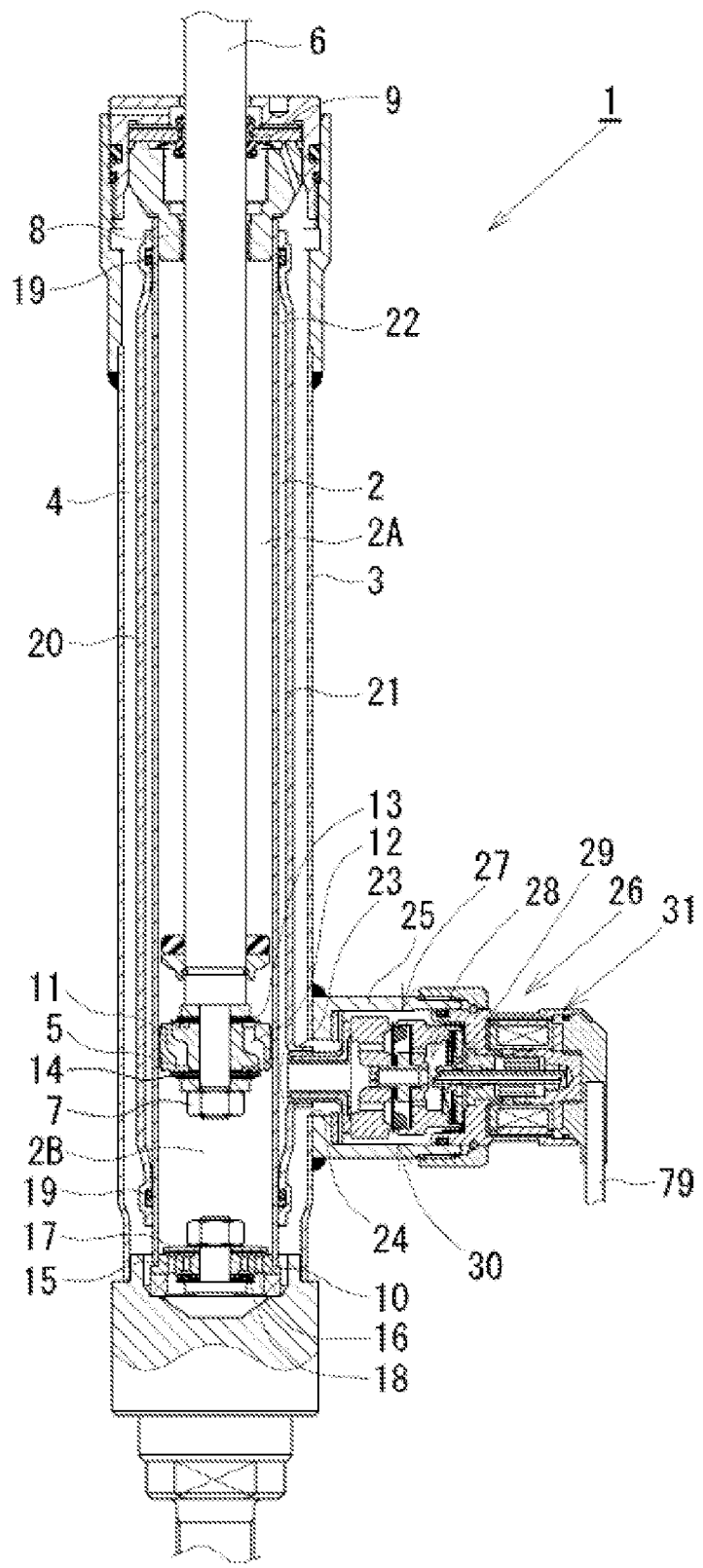
FIG. 1 is a vertical sectional view of a shock absorber according to an embodiment of the present invention.

As shown in FIG. 1, a damping force control type shock absorber 1 as a shock absorber according to this embodiment has a dual-tube structure comprising a cylinder 2 and an outer tube 3 provided around the outer periphery of the cylinder 2. A reservoir 4 is formed between the cylinder 2 and the outer tube 3. The cylinder 2 has a piston 5 slidably fitted therein. The piston 5 divides the interior of the cylinder 2 to define two chambers, i.e. a cylinder upper chamber 2A and a cylinder lower chamber 2B. One end of a piston rod 6 is connected to the piston 5 with a nut 7. The other end of the piston rod 6 extends through the cylinder upper chamber 2A and further extends to the outside of the cylinder 2 through a rod guide 8 and an oil seal 9, which are fitted to the upper end portion of the dual-tube structure comprising the cylinder 2 and the outer tube 3. The lower end portion of the cylinder 2 is provided with a base valve 10 dividing the cylinder lower chamber 2B and the reservoir 4 from each other.

The piston 5 is provided with passages 11 and 12 communicating between the cylinder upper and lower chambers 2A and 2B. The passage 12 is provided with a check valve 13 allowing only a flow of fluid from the cylinder lower chamber 2B toward the cylinder upper chamber 2A. The passage 11 is provided with a disk valve 14 that opens when the fluid pressure in the cylinder upper chamber 2A reaches a predetermined pressure to relieve the fluid pressure in the cylinder upper chamber 2A to the cylinder lower chamber 2B.

The base valve 10 is provided with passages 15 and 16 communicating between the cylinder lower chamber 2B and the reservoir 4. The passage 15 is provided with a check valve 17 allowing only a flow of fluid from the reservoir 4 toward the cylinder lower chamber 2B. The passage 16 is provided with a disk valve 18 that opens when the fluid pressure in the cylinder lower chamber 2B reaches a predetermined pressure to relieve the fluid pressure in the cylinder lower chamber 2B to the reservoir 4. As working fluid, hydraulic oil is sealed in the cylinder 2, and the hydraulic oil and gas are sealed in the reservoir 4.

The cylinder 2 has a separator tube 20 fitted thereover with seal members 19 interposed therebetween at the upper and lower ends of the cylinder 2. Thus, an annular passage 21 is formed between the cylinder 2 and the separator tube 20. The annular passage 21 is communicated with the cylinder upper chamber 2A through a passage 22 provided in a side wall of the cylinder 2 near the upper end thereof. The separator tube 20 has a circular cylindrical connecting opening 23 projecting sideward from a lower end part thereof. The side wall of the outer tube 3 is provided with an opening 24 in concentric relation to the connecting opening 23. The opening 24 is larger in diameter than the connecting opening. A circular cylindrical casing 25 is joined by welding or the like to the side wall of the outer tube 3 in such a manner as to surround the opening 24. A damping force generating mechanism 26 is installed in the casing 25.

Next, the damping force generating mechanism 26 will be explained with reference mainly to FIG. 2.

The damping force generating mechanism 26 comprises a valve block 30 having a pilot type (back-pressure type) main valve 27, a pilot valve 28, which is a solenoid-driven pressure control valve controlling the valve-opening pressure of the main valve 27, and a fail-safe valve 29 provided downstream of the pilot valve 28 to operate when there is a failure. The main valve 27, the pilot valve 28, and the fail-safe valve 29 are incorporated as one unit into the valve block 30. The damping force generating mechanism 26 further comprises a solenoid assembly 31 that actuates the pilot valve 28. An annular spacer 32 and a passage member 33 are inserted into the casing 25. The valve block 30 and the solenoid assembly 31 are connected together into one unit, inserted into the casing 25 and secured by screwing a nut 34 onto the casing 25.

The spacer 32 is secured in abutting contact with a bottom 25A formed at an end of the casing 25. The spacer 32 has a plurality of notches 32A for communication between the reservoir 4 and a chamber 102 in the casing 25. The passage member 33 is a circular cylindrical member having a flange portion 33A around the outer periphery of one end thereof and extending through the spacer 32. The passage member 33 is secured with a distal end thereof inserted into the connecting opening 23 and with the flange portion 33A abutting against the spacer 32. The passage member 33 is covered with a sealing member 33B to seal the joints between the passage member 33, on the one hand, and, on the other, the connecting opening 23 and a main body 35 (described later) of the valve block 30.

The valve block 30 has a main body 35, a pilot pin 36, which is a connecting member, and a pilot body 37, which is a casing member having an opening. The main body 35 is substantially annular and abuts at one end thereof against the flange portion 33A of the passage member 33. The main body 35 is provided with a plurality of circumferentially spaced passages 38 axially extending therethrough. The passages 38 communicate with a passage in the passage member 33 through an annular recess 100 formed at one end of the main body 35. The other end of the main body 35 has an annular seat portion 39 projecting at the outer periphery of the openings of the passages 38 and further has an annular clamp portion 40 projecting at the inner periphery of the openings of the passages 38. A main disk valve 41 is seated at an outer peripheral portion thereof on the seat portion 39 of the main body 35. The main disk valve 41 is a disk valve constituting the main valve 27. The inner peripheral portion of the main disk valve 41 is clamped, together with a retainer 42 and a washer 43, between the clamp portion 40 and the pilot pin 36. The main disk valve 41 has an annular sliding seal member 45 fixed to the outer peripheral portion of the rear side thereof by a method, for example, baking.

The pilot pin 36 is in the shape of a stepped circular cylinder having a large-diameter portion 36A in the middle thereof. The pilot pin 36 has an orifice 46 formed at one end thereof. The pilot pin 36 has its one end press-fitted into the main body 35 and clamps the main disk valve 41 by the large-diameter portion 36A. The other end of the pilot pin 36 forms a fitting portion that is press-fitted into a passage 50 in the pilot body 37. The other end of the pilot pin 36 has an outer peripheral portion chamfered at three equally spaced positions to form a chamfered portion 47 of substantially triangular cross-section having three axially extending cut portions. When the chamfered portion 47 is press-fitted into the passage 50 of the pilot body 37, which is a central fitting hole, three axially extending passages 47A are formed between the chamfered portion 47 and the inner wall of the passage 50. The pilot pin 36, which has the three-surface chamfered portion 47 of substantially triangular cross-section, can be formed easily by forging, for example. The pilot pin 36 may be formed with the chamfered portion 47 by cutting a columnar material instead of forging. If the pilot pin 36 is formed by forging, there will be no swarf or the like, which would otherwise be generated by cutting process. Therefore, contamination is unlikely to occur, and it is possible to improve not only productivity but also reliability.

The pilot body 37 is in the shape of a substantially bottomed circular cylinder having a bottom 37A in the middle thereof. The pilot body 37 has a passage 50 extending through the center of the bottom 37A. The chamfered portion 47 of the pilot pin 36 is press-fitted into the passage 50, and the bottom 37A of the pilot body 37 abuts against the large-diameter portion 36A of the pilot pin 36 with a flexible disk 48 (described later) interposed therebetween, thus the pilot body 37 being secured. The pilot body 37 has a circular cylindrical portion 37B at one end thereof. The sliding seal member 45 of the main disk valve 41 is slidably and fluid-tightly fitted to the inner peripheral surface of the cylindrical portion 37B to form a back-pressure chamber 49 at the back of the main disk valve 41. The main disk valve 41 lifts from the seat portion 39 to open upon receiving the passage 38-side pressure, thereby allowing the passages 38 to communicate with the chamber 102 in the casing 25, which is downstream of the main disk valve 41. The pressure in the back-pressure chamber 49 acts on the main disk valve 41 in the direction for closing the valve 41.

The pilot body 37 has passages 51 extending through the bottom 37A thereof. A flexible disk 48 is seated on a seat portion projecting from the periphery of the openings of the passages 51. The flexible disk 48 deflects in response to the pressure in the back-pressure chamber 49, thereby applying volumetric elasticity to the back-pressure chamber 49. In other words, the flexible disk 48 deflects to allow the volumetric capacity of the back-pressure chamber 49 to be increased in order to prevent the pressure in the back-pressure chamber 49 from excessively increasing due to the valve-opening operation of the main disk valve 41, which would otherwise cause the valve-opening operation of the main disk valve 41 to become unstable. The flexible disk 48 has diametrically extending elongated notches 52 formed on the inner peripheral edge of the disk 48A, which abuts against the pilot pin 36. The back-pressure chamber 49 and the passage 50 are communicated with each other through the notches 52 and the passages 47A, which are formed between the chamfered portion 47 of the pilot pin 36 and the passage 50 in the pilot body 37.

The pilot body 37 has a valve chamber 54 formed in a circular cylindrical portion 37C at the other end thereof. The bottom 37A of the pilot body 37 has an annular seat portion 55 projecting from the peripheral edge of the opening of the passage 50. The valve chamber 54 is provided therein with a pilot valve member 56 as a valve member constituting the pilot valve 28, which selectively unseats from and seats on the seat portion 55 to open and close the passage 50. The pilot valve member 56 is substantially circular cylindrical and tapered at a distal end portion thereof that selectively seats on and unseats from the seat portion 55. The pilot valve member 56 has a flange-shaped spring retaining portion 57 of large diameter on the outer periphery of the proximal end thereof. The pilot valve member 56 has a rod-receiving portion 58 of small diameter on the inner periphery of the distal end thereof. The inner peripheral edge of the opening at the rear of the pilot valve member 56 is gradually enlarged in diameter to form a tapered portion 56A. It should be noted that the spring retaining portion 57 acts as a pressure-receiving surface that receives the pressure in the valve chamber 54 in the state of abutting against a fail-safe disk 61. Therefore, in order to reduce the force for moving the pilot valve member 56 against the pressure in the valve chamber 54, it is desirable to reduce the diameter of the spring retaining portion 57 as much as possible while ensuring a diameter required for the spring retaining portion 57 to abut against a pilot spring 59 and the fail-safe disk 61.

The pilot valve member 56 is resiliently retained axially movably in opposing relation to the seat portion 55 by the pilot spring 59 as an urging member, a fail-safe spring 60, and the fail-safe disk 61. The cylindrical portion 37C at the other end of the pilot body 37 has an inner diameter stepwise increasing toward the opening end thereof, thereby forming two step portions 62 and 63 on the inner periphery thereof. The radially outer end portion of the pilot spring 59 is supported by the step portion 62. The step portion 63 supports a stack of a fail-safe spring 60, an annular retainer 64, a fail-safe disk valve 61, a retainer 65, a spacer 66, and a retaining plate 67. These stacked members are secured to the step portion 63 by a cap 68 fitted to the end of the cylindrical portion 37C.

The solenoid assembly 31 comprises a solenoid case 71, a coil 72, cores 73 and 74 inserted in the coil 72, a plunger 75 guided by the cores 73 and 74, and a hollow actuating rod 76 connected to the plunger 75. The coil 72, the cores 73 and 74, the plunger 75, and the actuating rod 76 are incorporated in the solenoid case 71 as one unit. The components of the solenoid assembly 31 are secured by an annular spacer 77 and a cup-shaped cover 78, which are attached to the rear end of the solenoid case 71 by caulking. The coil 72, the cores 73 and 74, the plunger 75, and the actuating rod 76 constitute in combination a solenoid actuator. When the coil 72 is supplied with an electric current through a lead wire 79, axial thrust is generated in the plunger 75 according to the supplied electric current. The distal end of the actuating rod 76 is tapered to form a tapered portion 76A on the outer peripheral edge thereof. A communicating passage 76B formed in the hollow actuating rod 76 communicates between the passage 50 and the valve chamber 54, on the one hand, and, on the other, a chamber at the rear of the actuating rod 76. The plunger 75 is provided with communicating passages 75A communicating between two chambers formed at the opposite ends of the plunger 75. The communicating passages 76B and 75A allow balancing the fluid forces acting on the actuating rod 76 and the plunger 75 and also apply appropriate damping force to the movement of the actuating rod 76 and the plunger 75.

The solenoid case 71 has at one end thereof a circular cylindrical portion 71A that is fitted into the casing 25. A large-diameter portion 69B of the cap 68 attached to the pilot body 37 is fitted into the cylindrical portion 71A. An O-ring 80 seals between the cylindrical portion 71A and the casing 25. The distal end of the actuating rod 76, which projects into the cylindrical portion 71A, is inserted into the pilot valve member 56 incorporated in the valve block 30 so that the distal end of the actuating rod 76 abuts against the rod-receiving portion 58, and the large-diameter portion 69B of the cap 68, which is attached to the pilot body 37, is fitted into the cylindrical portion 71A, thus connecting the solenoid case 71 to the valve block 30. The solenoid case 71 has a retaining ring 81 fitted in a groove on the outer periphery thereof. The solenoid case 71 is secured to the casing 25 by holding the retaining ring 81 with the nut 34.

Figure 2:
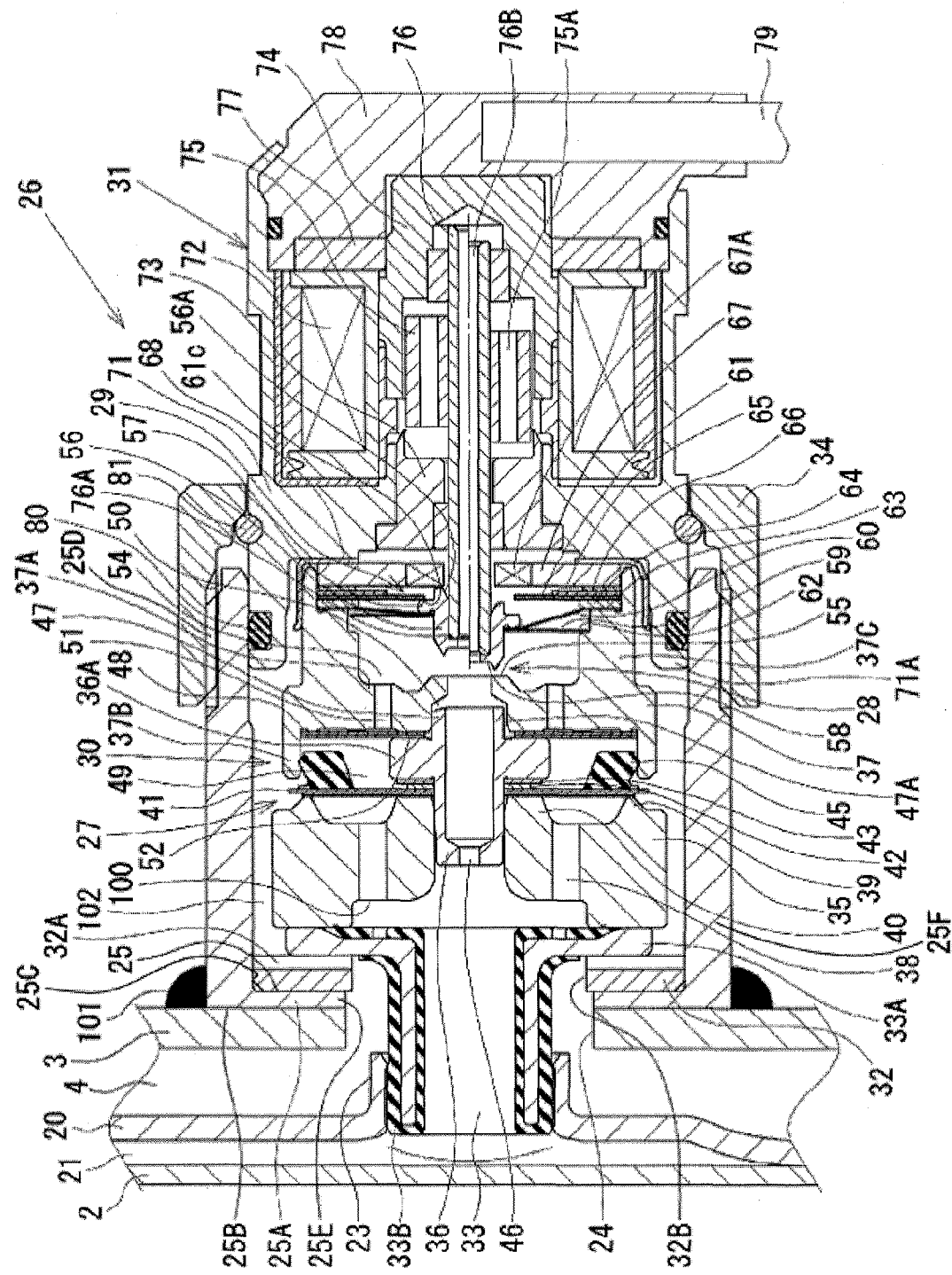
FIG. 2 is an enlarged vertical sectional view of a mounting portion of a damping force generating mechanism as an important part of the shock absorber shown in FIG. 1.

When the coil 72 is not energized in a state where the valve block 30 and the solenoid block 31 have been connected and the actuating rod 76 has been inserted into the pilot valve member 56, as shown in the upper half of FIG. 2 (i.e. the upper side of FIG. 2 with respect to the center line of the actuating rod 76 when the reference signs in the drawing are viewed upright; the same shall apply hereinafter), the pilot valve member 56 is retracted, together with the actuating rod 76, by the spring force of the fail-safe spring 60, so that the spring retaining portion 57 abuts against the fail-safe disk 61. At this time, the spring portion 59B of the pilot spring 59 is separate from the step portion 62 and therefore applies no spring force to the pilot valve member 56. When the coil 72 is energized, as shown in the lower half of FIG. 2 (i.e. the lower side of FIG. 2 with respect to the center line of the actuating rod 76 when the reference signs in the drawing are viewed upright; the same shall apply hereinafter), the pilot valve member 56 is advanced toward the seat portion 55 by the actuating rod 76, causing the spring portion 59B of the pilot spring 59 to abut against the step portion 62, and seating the pilot valve member 56 on the seat portion 55 against the spring forces of the fail-safe spring 60 and the pilot spring 59, and thus controlling the valve-opening pressure according to the electric current supplied to the coil 72.

Next, the casing 25 of the damping force generating mechanism 26, which is an important part of the present invention, will be explained in more detail with reference to FIGS. 2 to 5.

Figure 3:
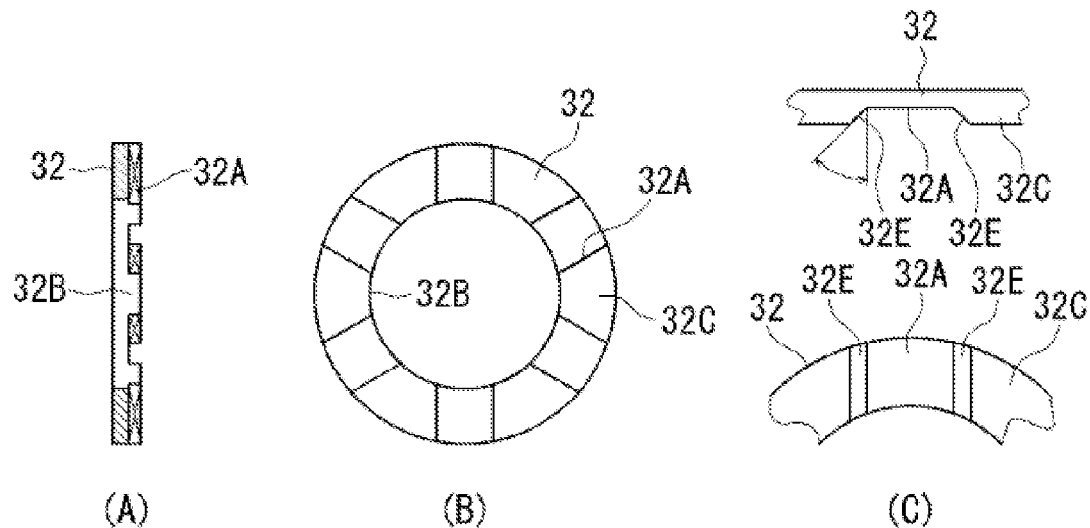
FIG. 3(A) is a vertical sectional view of a passage member fitted to a casing of the shock absorber shown in FIG. 1.
FIG. 3(B) is a front view of the passage member.
FIG. 3(C) is enlarged front and plan views showing a recess in a modification of the passage member.
Figure 4:
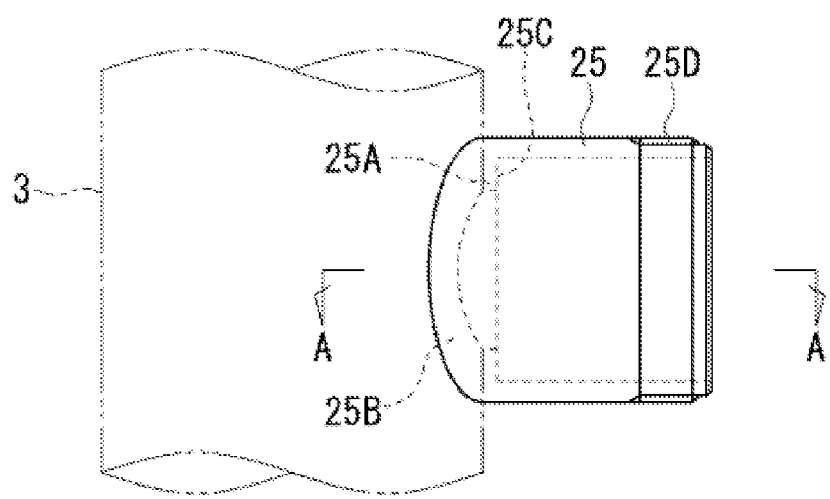
FIG. 4 is a side view of the casing of the shock absorber shown in FIG. 1.
Figure 5:
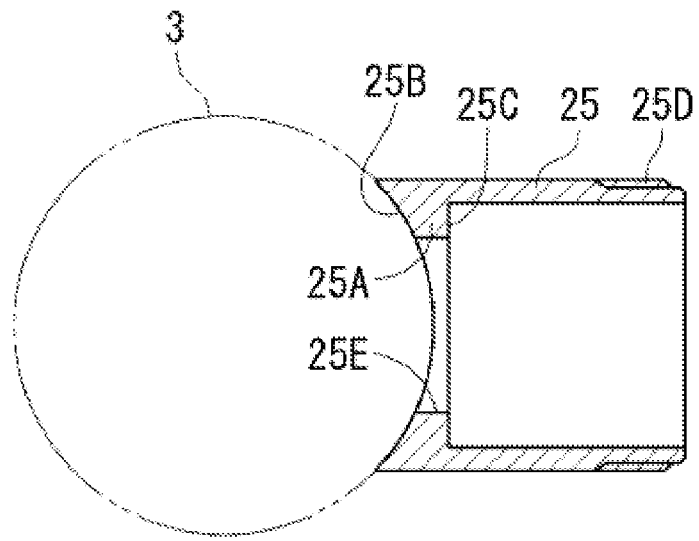
FIG. 5 is a horizontal sectional view taken along the line A-A in FIG. 4.

The casing 25 has a bottom 25A having a joint surface 25B that is joined to the outer tube 3. The joint surface 25B is formed in the shape of a curved surface curved along the outer peripheral surface of the outer tube 3. The bottom 25A further has an inner surface 25C that is abutted by the spacer 32. The inner surface 25C is formed flat. The casing 25 having such a structure is produced by a method wherein the casing 25 is integrally formed by forging, followed by forming a thread portion 25D by machining. As shown in FIG. 3, the spacer 32 is a plate-shaped annular member having an opening 32B communicating with an opening 25E in the bottom 25A of the casing 25. One end surface of the spacer 32 that abuts against the bottom 25A of the casing 25 is flat, and the other end surface of the spacer 32, which is abutted by the damping force control valve 27, has a plurality (six in the illustrated example) of equally spaced radially extending recesses 32A. Through the recesses 32A, a chamber 102 in the casing 25 and the reservoir 4 are connected to each other. It should be noted that the recesses 32A may be formed in any desired shape, provided that a necessary flow path area can be obtained, for example, a V-groove shape, an arcuate groove shape, and so forth, in addition to the illustrated rectangular shape. The casing 25 is joined to the outer tube 3 by abutting the joint surface 25B of the bottom 25A against the outer tube 3 and welding the periphery of the joint. The weld is denoted by reference sign 101 (see FIGS. 1 and 2).

It should be noted that the method of forming the casing 25 is not limited to forging, and that the casing 25 may be formed by casting or by cutting a columnar material.

Unlike the process in which a pipe material is cut into the configuration of the joint surface 25B, i.e. a configuration conforming to a circular cylinder, and a bottom is welded to the inside of the pipe material, the present invention has the casing 25 integrally formed from only a metal without a space between the bottom 25A and the joint surface 25B by forging, casting, or cutting. Therefore, it is possible to readily increase the accuracy of positional relationship between the joint surface and the bottom. In addition, because the joint surface can be increased in area, it is less likely that the casing 25 may be mounted at a tilt undesirably than in a case where a cut surface obtained by cutting a pipe material is used as a contact surface. Accordingly, the casing 25 can be mounted with high accuracy.

Regarding the casing 25, the joint surface 25B is formed in the shape of a curved surface curved along the outer peripheral surface of the outer tube 3, and the inner surface 25C of the bottom 25A is formed flat. Therefore, the wall thickness of the casing 25 from the joint surface 25B to the bottom 25A increases as the distance from the opening 25E increases. When the wall thickness is not uniform as in the case of the casing 25, it is more desirable to form the casing 25 by forging than casting.

It is also desirable to form the casing 25 by forging from the viewpoint that high dimensional accuracy and high strength are demanded.

Further, when forging or casting is used to form the casing 25, it is desirable from the viewpoint of improving the sealing performance of the O-ring 80 to use cutting to smooth the plane surface where the O-ring 80 is inserted and disposed. Further, when forging or casting is used to form the casing 25, it is preferable from the viewpoint of easiness of machining to temporarily form the joint surface 25B over the entire area and then form the opening 25E by cutting.

When cutting is used to form the recesses 32A, it is desirable that, as shown in FIG. 3(C), the stepped portions at the circumferentially opposite ends of each recess 32A should be formed into tapered surfaces 32E, because, with this structure, the angle at which a cutting tool abuts against the spacer 32 becomes less acute (e.g. 45°), and, consequently, occurrence of burrs is reduced.

Although FIG. 2 shows a structure in which the casing 25 has a thread portion 25D formed thereon by machining, and the casing 25 and the solenoid case 71 are secured to each other through a nut 34, the solenoid case 71 may be formed on the casing 25 by caulking, for example. With this structure, it is possible to reduce the wall thickness of the cylindrical portion 25F of the casing 25. In such a case, forging is an even more desirable method of forming the casing 25.

Next, the operation of the damping force control type shock absorber 1 will be explained.

The damping force control type shock absorber 1 is installed between sprung and unsprung members of a suspension system of a vehicle, and the lead wire 79 is connected to an in-vehicle controller or the like. In a normal operating state, the coil 72 is energized to seat the pilot valve member 56 on the seat surface of the pilot body 37 to execute pressure control by the pilot valve 28.

During the extension stroke of the piston rod 6, the movement of the piston 5 in the cylinder 2 closes the check valve 13 of the piston 5. Before the disk valve 14 opens, the fluid in the cylinder upper chamber 2A is pressurized to flow through the passage 22 and the annular passage 21 into the passage member 33 of the damping force generating mechanism 26 from the connecting opening 23 of the separator tube 20.

At this time, an amount of hydraulic oil corresponding to the amount of movement of the piston 5 flows into the cylinder lower chamber 2B from the reservoir 4 by opening the check valve 17 of the base valve 10. It should be noted that, when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive increase in pressure in the cylinder upper chamber 2A.

In the damping force generating mechanism 26, the hydraulic oil flowing in from the passage member 33 flows as follows. Before the main disk valve 41 of the main valve 27 opens (in the low piston speed region), the hydraulic oil flows through the orifice passage 46 in the pilot pin 36 and the passage 50 in the pilot body 37 and pushes open the pilot valve member 56 to flow into the valve chamber 54. From the valve chamber 54, the hydraulic oil further passes through the opening of the fail-safe disk 65 and flows into the reservoir 4 through the opening 67A of the retaining plate 67, the notches 70A of the cap 68, the chamber 25B in the casing 25, and the notches 32A of the spacer 32 (see the upper half of FIG. 2). When the piston speed increases and the pressure in the cylinder upper chamber 2A reaches the valve-opening pressure of the main disk valve 41, the hydraulic oil flowing into the passage member 33 passes through the annular recess 100 and the passages 38 and pushes open the main disk valve 41 to flow directly into the chamber 25B in the casing 25.

During the compression stroke of the piston rod 6, the movement of the piston 5 in the cylinder 2 opens the check valve 13 of the piston 5 and closes the check valve 17 for the passage 15 of the base valve 10. Before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A into the reservoir 4 through a flow path similar to that during the above-described extension stroke. It should be noted that, when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive increase in pressure in the cylinder lower chamber 2B.

Thus, during both the extension and compression strokes of the piston rod 6, the damping force generating mechanism 26 operates as follows. Before the main disk valve 41 of the main valve 27 opens (in the low piston speed region), damping force is generated by the orifice passage 46 and the valve-opening pressure of the pilot valve member 56 of the pilot valve 28. After the main disk valve 41 has opened (in the high piston speed region), damping force is generated according to the degree of opening of the main disk valve 41. The damping force can be controlled directly, independently of the piston speed, by adjusting the valve-opening pressure of the pilot valve 28 by the electric current supplied to the coil 72. In this regard, variation in the valve-opening pressure of the pilot valve 28 causes a change in the pressure in the back-pressure chamber 49 communicating with the passage 50, which is upstream of the pilot valve 28, through the passages 47A formed by the chamfered portion 47 of the pilot pin 36 and through the notches 52 of the disk 48A, and the pressure in the back-pressure chamber 49 acts in the direction for closing the main disk valve 41. Therefore, by controlling the valve-opening pressure of the pilot valve 28, the valve-opening pressure of the main disk valve 41 can be controlled simultaneously, and hence the control range of damping force characteristics can be widened.

In this regard, when the electric current supplied to the coil 72 is reduced to reduce the thrust of the plunger 75, the valve-opening pressure of the pilot valve 28 lowers, and soft damping force is generated. When the electric current supplied to the coil 72 is increased to increase the thrust of the plunger 75, the valve-opening pressure of the pilot valve 28 rises, and hard damping force is generated. Accordingly, soft damping force, which is generally used frequently, can be generated with a reduced electric current, and the power consumption can be reduced.

In the event that the thrust of the plunger 75 is lost because of a failure such as disconnection of the coil 72 or a trouble in the in-vehicle controller, the pilot valve member 56 is refracted by the spring force of the fail-safe spring 60. As a result, the passage 50 opens, and the spring retaining portion 57 of the pilot valve member 56 abuts against the fail-safe disk 61 to close the flow path between the valve chamber 54 and the chamber 25B in the casing 25. In this state, the fail-safe valve 29 controls the flow of hydraulic oil in the valve chamber 54 from the passage 50 to the chamber 102 in the casing 25. Therefore, it is possible to generate a desired damping force and to adjust the pressure in the back-pressure chamber 49, i.e. the valve-opening pressure of the main disk valve 41, by setting the flow path area of the notches 61C and the valve-opening pressure of the fail-safe disk 61. Consequently, an appropriate damping force can be obtained even in the event of a failure.

The following is an explanation of the important part of this embodiment.

By integrally forming the casing 25 of the damping force generating mechanism 26 by forging, it is possible to readily produce the casing 25 having the bottom 25A, which is formed with the joint surface 25B curved along the outer peripheral surface of the outer tube 3, the flat inner surface 25C abutted by the spacer 32, and the opening 25E, and it is possible to obtain the required strength and dimensional accuracy. Thus, it is possible to greatly reduce the number of parts to be machined and hence possible to reduce the machining time, to increase the yield, and to reduce the production cost, as compared to the conventional process in which the casing is produced by machining a pipe material.

Further, in this embodiment, the stacked components inserted into the casing 25 are pressed against the bottom 25A by tightening the nut 34, and thus an axial force is applied thereto. Consequently, the stacked components are surely secured without separating from each other. The axial force is also applied to the spacer 32 and the casing 25. Because the spacer 32 has recesses 32A and wall portions 32C alternately provided in the circumferential direction, the axial force can be surely received by the wall portions 32C. In addition, because the casing 25 has a bottom 25A formed by forging, the axial force can be received by the bottom 25A. Therefore, it is possible to reduce stress that is applied to the outer tube 3 by the axial force. With the conventional process in which the casing is produced from a pipe material, the axial force is easily transmitted to the outer tube 3; therefore, it is necessary to increase the wall thickness of the outer tube 3. In this regard, in this embodiment, the axial force is not applied directly to the outer tube 3. Therefore, the wall thickness of the outer tube 3 can be reduced correspondingly, or a correspondingly increased axial force can be applied. Further, with the conventional process in which the casing is produced from a pipe material, it is difficult to form the inside of the bottom 25A into a flat surface. In contrast to the conventional process, this embodiment allows the inside of the bottom 25A to be readily formed into a flat surface because the casing 25 is produced by forging.

Figure 6:
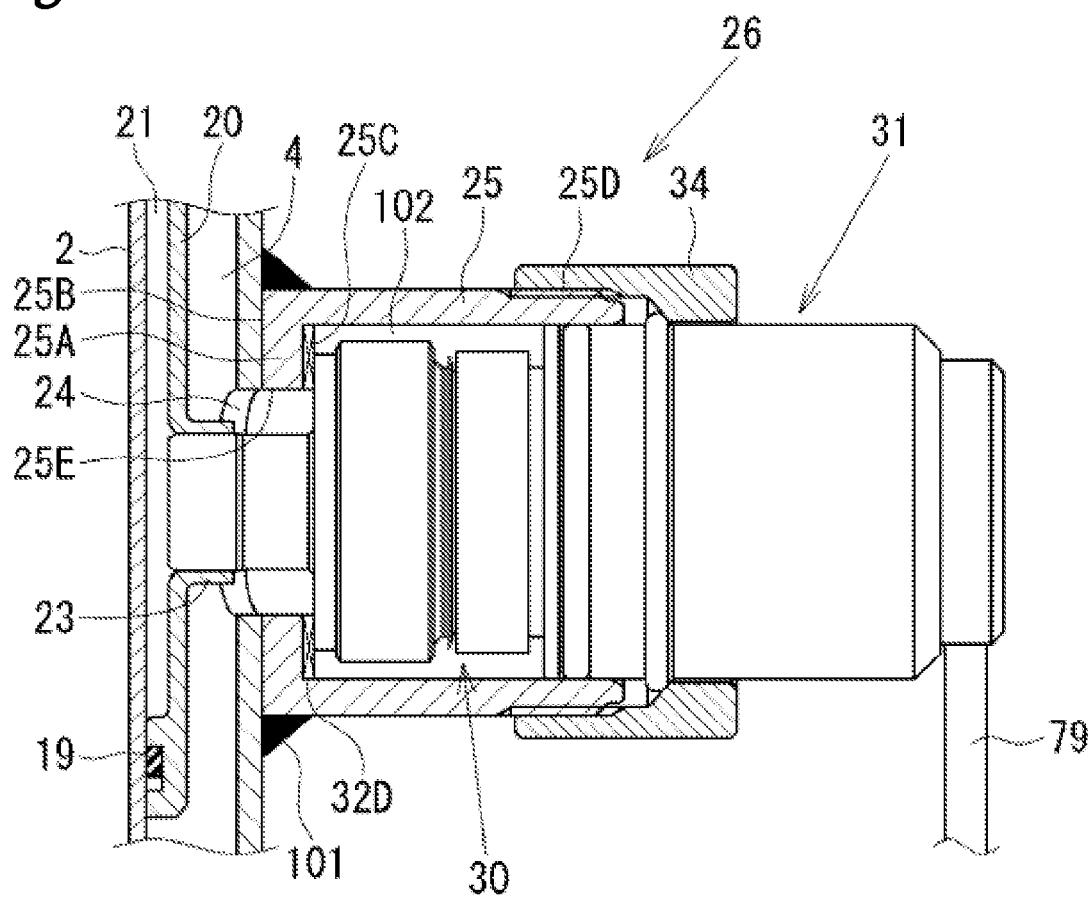
FIG. 6 is an enlarged view of a mounting portion of a damping force generating mechanism as an important part of a shock absorber according to a second embodiment of the present invention.

Next, a second embodiment of the present invention will be explained with reference to FIG. 6.

It should be noted that, in the following explanation, portions similar to those of the above-described embodiment are denoted by the same reference signs as in the described embodiment, and that only the portions in which the second embodiment differs from the described embodiment will be explained in detail. For the damping force generating mechanism 26, a detailed explanation and illustration of the interior thereof are omitted.

In a shock absorber according to the second embodiment, the spacer 32 of the damping force generating mechanism 26 is omitted, and instead a recess 32D is formed on the inner surface 25C of the bottom 25A of the casing 25. In this case, the recess 32D can be formed on the inner surface 25C of the bottom 25A when the casing 25 is produced by forging. Therefore, the number of components can be reduced without adding an extra machining process. Accordingly, it is possible to increase productivity and to reduce the production cost. If it is desired to further increase accuracy, it suffices to machine only the inner surface 25C by cutting.

Although in the foregoing first and second embodiments the present invention has been explained as being applied to a dual-tube shock absorber provided with the reservoir 4 by way of example, the present invention is not limited thereto but may be applied to a single-tube shock absorber having a gas chamber formed in a cylinder by a free piston. Further, the working fluid is not limited to hydraulic oil and gas but may be other liquid and gas, or may be only gas. When the working fluid is only gas, the reservoir 4, the base valve 10 and the free piston are unnecessary. Although a structure in which an axial force is applied to the damping force generating mechanism 26 has been shown, the present invention may also be applied to a casing housing a damping force generating mechanism to which no axial force is applied. In such a case also, it is possible to provide advantages such as increased productivity and reduced production cost.

The invention claimed is:

1. A tube-type shock absorber comprising:
a circular cylindrical cylinder part having a working fluid sealed therein;
a piston movable in the cylinder part;
a piston rod connected to the piston and extended to an outside of the cylinder part;
a circular cylindrical casing joined to a side surface portion of the cylinder part; and
a damping force generating device housed in the casing to generate a damping force by controlling a flow of hydraulic fluid induced by movement of the piston,
wherein the casing is in a shape of a circular cylinder with a bottom, the bottom having an opening and an inner surface including a planar portion around the opening, the bottom having a joint surface that is joined to the cylinder part, the joint surface being curved along an outer peripheral surface of the cylinder part,
wherein the bottom of the casing has the inner surface and the joint surface integrally formed by forging,
wherein the damping force generating device is provided on the inner surface of the bottom of the casing, wherein a recess is formed on the inner surface of the bottom of the casing, the recess being concaved from the inner surface and extending to the opening in a radial direction, the recess being integrally formed with the bottom by forging, and wherein a flow path of the hydraulic fluid communicates between the damping force generating device and the opening by the recess.

2. The shock absorber of claim 1, wherein the cylinder part is an outer tube, a cylinder being provided in the outer tube, and wherein the piston is slidably fitted in the cylinder.

3. The shock absorber of claim 1, wherein the damping force generating device abuts against the inner surface of the bottom of the casing with an axial force being applied to the inner surface.

4. The shock absorber of claim 2, wherein the damping force generating device abuts against the inner surface of the bottom of the casing with an axial force being applied to the inner surface.

* * * * *